United States Patent
Bister et al.

(10) Patent No.: US 11,568,037 B2
(45) Date of Patent: Jan. 31, 2023

(54) WHEEL-BASED AUTHENTICATION

(71) Applicant: International Business Machines Corporation, Armonk, NY (US)

(72) Inventors: John Bister, Austin, TX (US); Hyun Kyu Seo, Austin, TX (US); Chase Kettl, Austin, TX (US); Caitlin Gettinger, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

(21) Appl. No.: 16/808,655

(22) Filed: Mar. 4, 2020

(65) Prior Publication Data

US 2021/0279321 A1 Sep. 9, 2021

(51) Int. Cl.
*G06F 21/36* (2013.01)
*H04L 9/40* (2022.01)
*G06F 3/0488* (2022.01)
*G06F 3/04842* (2022.01)

(52) U.S. Cl.
CPC ............ *G06F 21/36* (2013.01); *G06F 3/0488* (2013.01); *G06F 3/04842* (2013.01); *H04L 63/0846* (2013.01); *H04L 63/108* (2013.01)

(58) Field of Classification Search
CPC .... G06F 21/36; G06F 3/04842; G06F 3/0488; H04L 63/0846; H04L 63/108
See application file for complete search history.

(56) References Cited

U.S. PATENT DOCUMENTS

| | | | |
|---|---|---|---|
| 8,963,869 B2 | 2/2015 | Hicks et al. | |
| 9,160,744 B1* | 10/2015 | Machani | H04L 63/0428 |
| 9,397,992 B1* | 7/2016 | Dotan | H04L 63/10 |
| 9,430,634 B1 | 8/2016 | Dotan et al. | |
| 9,519,763 B1 | 12/2016 | Rodriguez et al. | |
| 2010/0333197 A1* | 12/2010 | Wang | G06F 21/36 726/19 |
| 2019/0235347 A1* | 8/2019 | Robinson | G02F 1/29 |
| 2021/0034226 A1* | 2/2021 | Guazzi | G06F 3/04883 |

OTHER PUBLICATIONS

Norrington, "Novel, Robust and Cost-Effective Authentication Techniques for Online Services", Dissertation submitted to the University of Bedforshire, Jan. 2009, 451 pages.
"A method of user authentication for screen-touched devices", An.IP com Prior Art Database Technical Disclosure, IP.com No. IPCOM000245968D, IP.com Electronic Publication Date: Apr. 21, 2016, 5 pages.

(Continued)

*Primary Examiner* — Sherrod L Keaton
(74) *Attorney, Agent, or Firm* — Scott Dobson (57) ABSTRACT

A computer-implemented method for authentication is provided. The method includes displaying, on a display device and while in a locked state, a set of color wheels, each color wheel having a plurality of segments with each segment being a different color. User input is received via an input device on the set of color wheels. The user input is converted to a string. The string is communicated to an authentication server. In response to communicating the string, a response is received from the authentication server and the response is processed.

16 Claims, 7 Drawing Sheets

(56) References Cited

OTHER PUBLICATIONS

"Method and Apparatus to use image selection for authentication", An IP.com Prior Art Database Technical Disclosure, IP.com No. IPCOM000244846D, IP.com Electronic Publication Date: Jan. 22, 2016, 3 pages.

IBM, "Captcha integrated Knowledge Based Authentication to provide stronger and easier authentication", An IP.com Prior Art Database Technical Disclosure, Original Publication Date: Sep. 17, 2008, IP.com No. IPCOM000174603D, 4 pages.

\* cited by examiner

WHEEL-BASED AUTHENTICATION

BACKGROUND

The present disclosure relates to computing device security, and more specifically, to authentication for computing device security.

Many digital devices require a personal identification number (PIN) to unlock. Often a user will select a PIN based on a number that is well known to the user. For example, users may choose PINs based on birthdays, anniversaries, addresses, or other numerical data that may be publicly known and tested by an unauthorized accessor.

SUMMARY

According to embodiments of the present disclosure, a computer-implemented method is provided. The method includes displaying, on a display device and while in a locked state, a set of color wheels, each color wheel having a plurality of segments with each segment being a different color. User input is received via an input device on the set of color wheels. The user input is converted to a string. The string is communicated to an authentication server. In response to communicating the string, a response is received from the authentication server and the response is processed.

Further embodiments provide a system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to authenticating user, and more particular aspects relate to authenticating users using a series of wheels on a display. While the present disclosure is not necessarily limited to such applications, various aspects of the disclosure may be appreciated through a discussion of various examples using this context.

The present disclosure may provide a mechanism for authentication on electronic devices using a series of wheels. The wheels may be concentric. Each wheel may contain several sections with each section being a different color. A challenge may be set that is used to perform authentication. The challenge may include a specific color sequence, an order of rotating the wheels, a direction of rotating the wheels, and a speed of rotating the wheels. A user may unlock their device by rotating each of the series of concentric color wheels on the display of the device to enter a specific color sequence according to the challenge.

In some embodiments, a user is prompted to enter their unique color sequence each time a screen lock engages. If the user is successful, the user may be given access to their device.

In some embodiments, a client device communicates with a server to create the challenge and perform authentication. Input from the user on the color wheels may be converted into a string before it is communicated to the server. The server may store the initially created challenge string and compare it to strings received during authentication attempts. The server may communicate a response to the client device based on the comparison.

Different authentication policies may be used to set up an authentication account and perform authentication. The policy may define the number of wheels, the colors, a time threshold for user input, and the factors included in the challenge (i.e., color sequence, order of rotation, etc.).

While the present disclosure describes using colors for each section, any visually distinguishable element may be used, as would be apparent to one of ordinary skill in the art. For example, the various sections may contain differences in patterns or text to visually distinguish the different sections.

Figure 1:
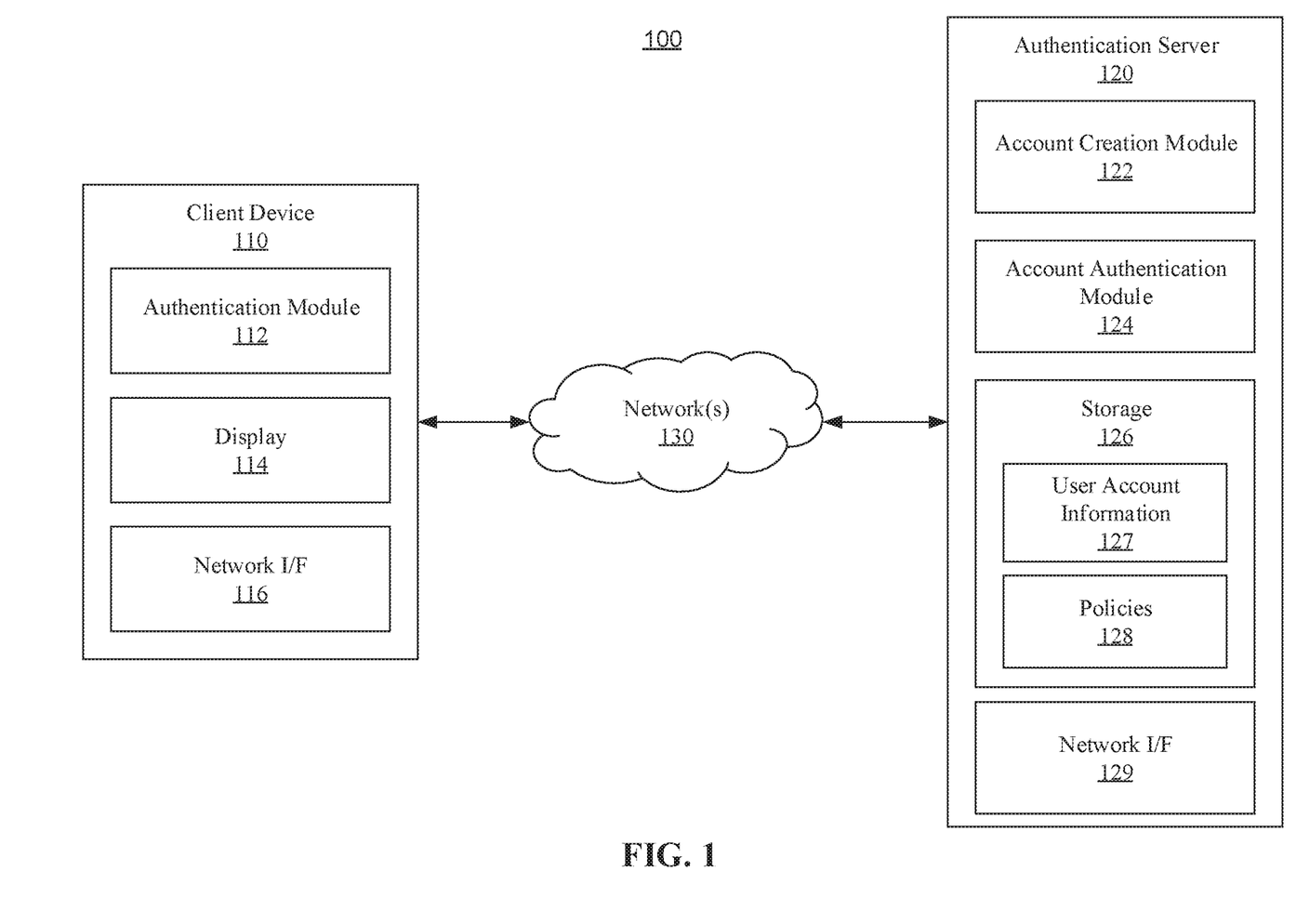
FIG. 1 depicts a system for providing authentication according to embodiments.

Referring now to FIG. 1, a system 100 for providing authentication is depicted according to embodiments. System 100 includes a client device 110 and an authentication server 120. Client device 110 and authentication server 120 may communicate over one or more networks 130 via network interfaces 116 and 129. In an example embodiment, network 130 may be the Internet, representing a worldwide collection of networks and gateways to support communications between devices connected to the Internet. The network 130 may include, for example, wired, wireless, or fiber optic connections. In alternative embodiments, the network 130 may be implemented as an intranet, a local area network (LAN), or a wide area network (WAN). In general, the network 130 can be any combination of connections and protocols that will support communications between client device 110 and authentication server 120. The modules described herein may be implemented using a combination of hardware and software.

Client device 110 may include an authentication module 112, display 114, and network interface 116. Authentication module 112 may be configured to perform account creation and authentication by displaying a series of wheels on display 114, converting input from a user on the series of wheels to a string, and communicating the string to authentication server 120. In some embodiments, display 114 is a touchscreen and input from the user is provided via the touchscreen. Authentication module 112 may be configured to perform method 300 described in reference to FIG. 3 and/or method 500 described in reference to FIG. 5.

Authentication server 120 may include an account creation module 122, an account authentication module 124, a storage 126, and a network interface. Account creation module 122 may be configured to generate an authentication account for client device 110 using policies 128 in storage 126. Account creation module may be configured to store user account information 127 in storage 126. Account creation module 122 may be configured to perform method 400 described in reference to FIG. 5. Account authentication module 124 may be configured to receive a string from client device 110, compare the string to stored user account information 127, and communicate a response to client device 110 based on the comparison. Account authentication module 124 may be configured to perform method 600 described in reference to FIG. 6.

Figure 2:
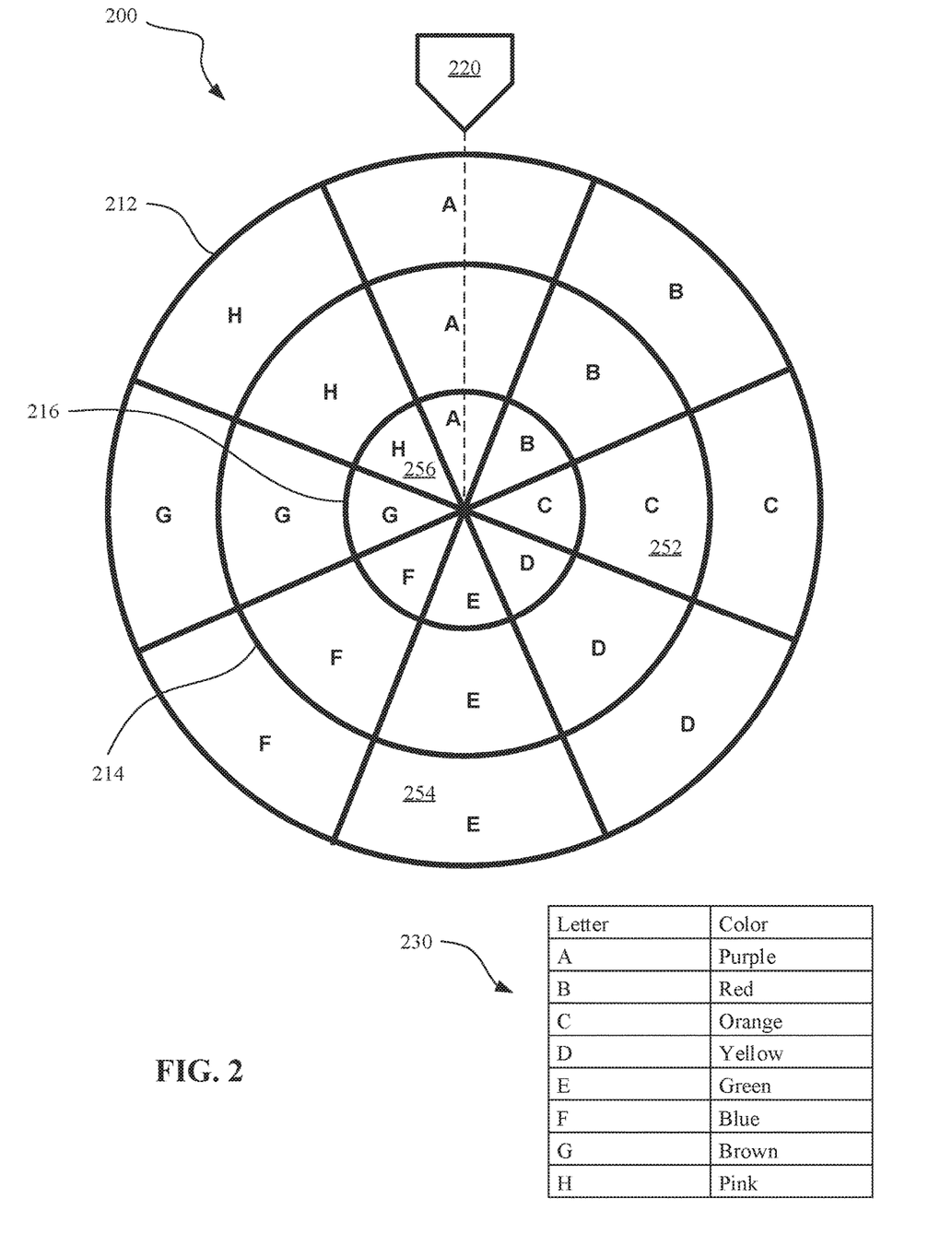
FIG. 2 depicts a user interface display according to embodiments.

Referring now to FIG. 2, a user interface display 200 is depicted according to embodiments of the present disclosure. Display 200 includes a series of concentric wheels 212, 214, and 216, and an arrow 220. Each concentric wheel contains 8 sections with each section being a different color. Because FIG. 2 is presented in black and white, colors have been represented in the figure using letters as denoted in legend 230 (i.e., a user would not see the letters and instead would see the colors associated with the letters). For example, section 252 would appear as orange according to legend 230. The number of wheels and the number of sections may vary in different embodiments. While the depicted embodiment contains the same number of sections for each wheel, in some embodiments each wheel may contain a different number of sections.

Arrow 220 may be used to indicate which section is being selected by a user as they rotate a wheel. A dashed line is depicted from arrow 220 to the center of the concentric wheels. A section may be selected by a user by rotating a wheel until the arrow 220 is pointing at the section (i.e., the dashed line passes through the section). The dashed line is depicted for explanatory purposes and is not be displayed to a user in some embodiments.

In an example embodiment, the challenge that a user must enter is middle wheel to orange, followed by outer wheel to green, and then inner wheel to pink. To enter the challenge, the user may first rotate wheel 214 until section 252 is lined up with arrow 220. Then, the user may rotate wheel 212 until section 254 is lined up with arrow 220. Then, the user may rotate wheel 216 until section 256 is lined up with arrow 220.

Figure 3:
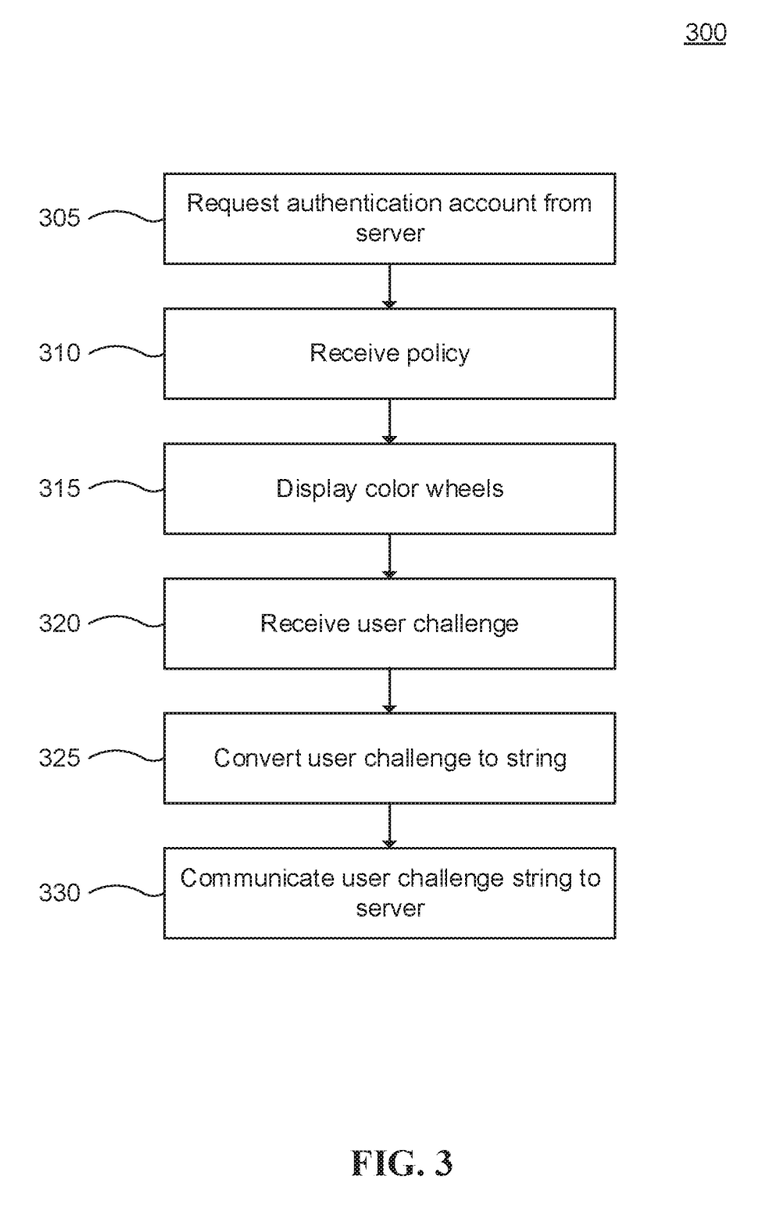
FIG. 3 depicts a flowchart of a method for creating an authentication account by a client device according to embodiments.

Referring now to FIG. 3, a flowchart of a method 300 for creating an authentication account is depicted according to embodiments. Method 300 may be performed by a computing device such as computer system 701 depicted in reference to FIG. 7. Method 300 is described herein as being performed by a client device such as client device 110 described in reference to FIG. 1, but this is not intended to be limiting.

Method 300 begins with a client device requesting an authentication account from a server per 305. For example, a user may initiate set up of the authentication account on the user device and the user device may communicate the request to set up an authentication account over one or more networks to an authentication server. In some embodiments, the request may include an indication of a particular policy that will define the challenge.

In response to the request, the client device may receive a policy for the authentication account from the server per 310. The policy may be received over one or more networks from an authentication server. The policy may include a number of wheels, a number of sections, a time threshold, a color key, a set of factors for the challenge, and a default position for the color wheels. Some or all of the aspects of the policy may be saved in memory on the client device for reference during future authentication attempts using the authentication account.

In response to receiving the policy from the server, the client device may display the color wheels to a user per 315. The color wheels may be generated according to the received policy. The client device may display the color wheels on any suitable display device. The display device may be an integrated display or a connected display. In some embodiments, the client device may further display an indicator that may be used by a user to align the color wheels such as, for example, arrow 220 described in reference to FIG. 2.

The client device may receive the user challenge on the displayed color wheels per 320. A user may input the challenge using any suitable input device such as a touchscreen or a mouse. For example, a user may touch a wheel and drag their finger across a touchscreen to cause the wheel to rotate. The client device may record the user interaction with the color wheels according to the set of factors in the received policy. For example, the client device may record the color for each wheel, the order of the movement of the wheels, the direction each wheel was rotated, the speed of rotation of each wheel, etc. In some embodiments, the client device may record the user input until a challenge time threshold has been reached.

The client device may convert the received challenge to a string per 325. The received challenge may be converted to a string using a predetermined format in plain text. For example, the challenge including turn the middle wheel counterclockwise to yellow, then turn the outer wheel clockwise to red, then turn the inner wheel to blue may be converted to the string "1:1,#Ffe600,2:r,#Ff0000,0:1,#0500ff".

The client device may communicate the user challenge string to the server per 330. For example, the client device may communicate the string over one or more networks to the authentication server.

Figure 4:
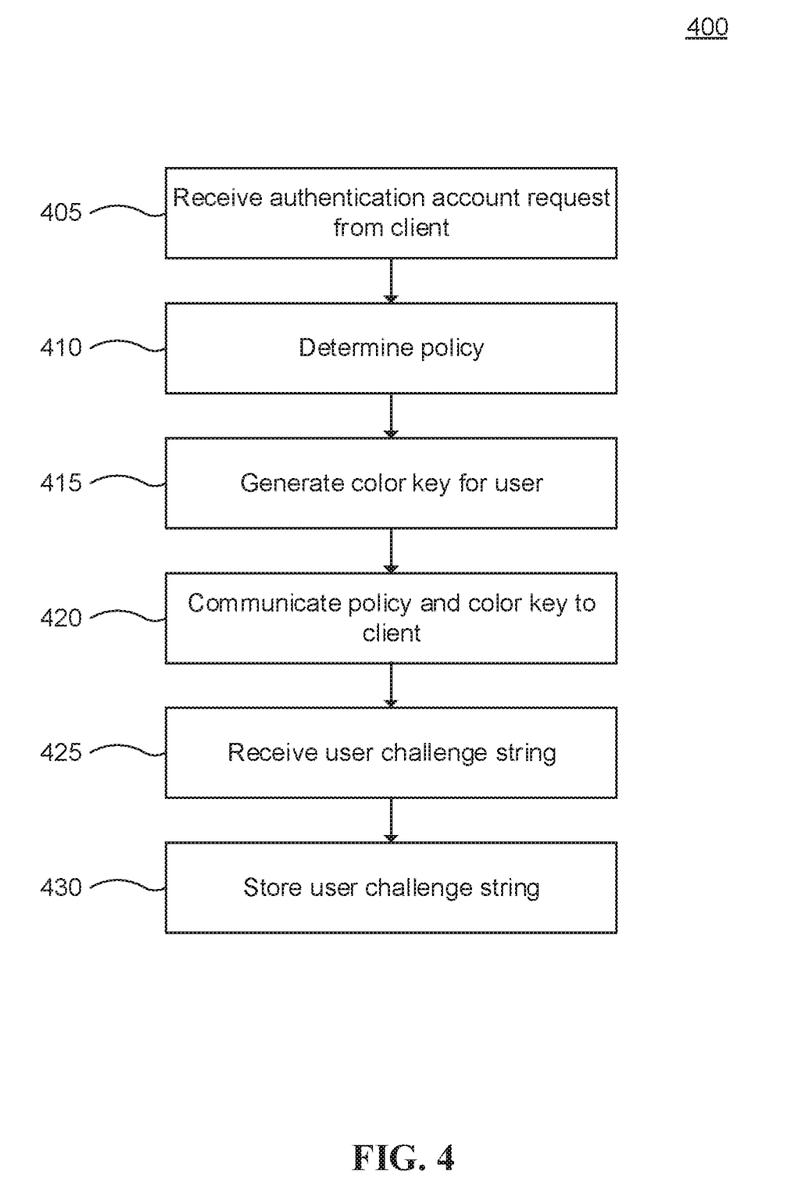
FIG. 4 depicts a flowchart of a method for creating an authentication account on an authentication server according to embodiments.

Referring now to FIG. 4, a flowchart of a method 400 for creating an authentication account on a server is depicted according to embodiments. Method 400 may be performed using any suitable computing system such as computer system 701 described in reference to FIG. 7. Method 400 is described herein as being performed by an authentication server such as server 120 described in reference to FIG. 1, but this is not intended to be limiting.

Method 400 begins with an authentication server receiving an authentication account request from a client device per 405. A communication with the request may be received from the client device over one or more networks. The request may contain identifying information for the client device or a user of the client device. For example, the identifying information may be a unique identifier of the client device or a unique username for the user of the client device. In some embodiments, the request may specify some or all of the policy information for the account.

In response to receiving the request, the authentication server may determine a policy for the account per 410. As described herein, the policy may include a number of wheels, a number of sections, a challenge time threshold, a set of colors, a set of factors for the challenge, and a default position for the color wheels. A policy or certain aspects of a policy may be specified by the request from the client device. A default policy may be used if a specific policy is not requested.

The authentication server may generate a color key for the account. The color key may be based on a set of colors from the determined policy. In some embodiments, the color key is generated by applying a random integer (e.g., between −10 and +10) to modify RGB values of all colors defined by the policy.

The authentication server may communicate the policy and color key to the client device per 420. For example, the authentication server may communicate the policy and color key to the client device over one or more networks.

The authentication server may receive a challenge string from the client device per 425. The challenge string may be a user-defined challenge that was entered by a user of the client device and converted to a string. The challenge string may be received from the client device over one or more networks.

The authentication server may store the challenge string per 430. The authentication server may store the challenge string in a location associated with the client device or user of the client device in any suitable storage device. For example, the authentication server may maintain a database of user authentication information that can be queried by identifying information for the client device or user of the client device that was received from the client device. In some embodiments, the authentication server further stores the color key with the challenge string. The color key may be encoded prior to being stored.

Figure 5:
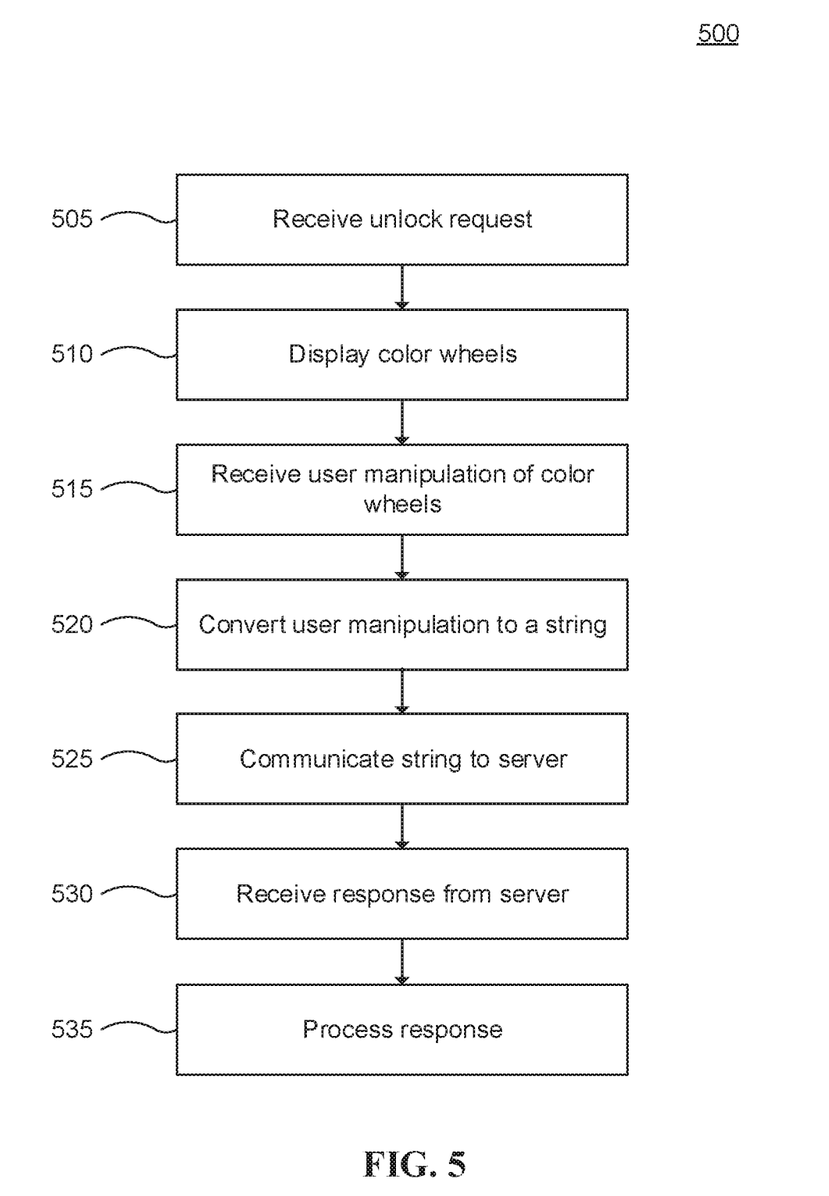
FIG. 5 depicts a flowchart of a method for performing authentication by a client device according to embodiments.

Referring now to FIG. 5, a flowchart of a method 500 for performing authentication by a client device is depicted according to embodiments. Method 500 may be performed by a computing device such as computer system 701 depicted in reference to FIG. 7. Method 500 is described herein as being performed by a client device such as client device 110 described in reference to FIG. 1, but this is not intended to be limiting.

The client device may receive an unlock request from a user per 505. In some embodiments, the client device may interpret any user provided an input using any suitable input device such as a touchscreen, a mouse, or a gyroscope as an unlock request when the client device is in a locked state. In some embodiments, an unlock request is not required as the color wheels are continuously displayed while the device is in a locked state.

In response to receiving the unlock request, the client device may display the color wheels to the user per 510. The client device may display the color wheels according to a policy received from an authentication server when an authentication account was created. The client device may display the color wheels using any suitable display device. In some embodiments, the client device may further display an indicator that may be used by a user to align the color wheels such as, for example, arrow 220 described in reference to FIG. 2. In some embodiments, the client device may apply a noise filter to the colors before rendering to ward off possible brute force attacks from captured screenshots.

The client device may receive the user input on the color wheels per 515. The input may be received using any suitable input device such as a mouse, touchscreen, or keyboard. The user input may include the selection and rotation of the displayed color wheels to select specific color segments on the wheels. The client device may record any necessary information for the challenge as defined by the authentication policy such as order of moving the wheels, the colors selected for each wheel, the direction of moving each wheel, and the speed of rotation of each wheel. In some embodiments, the client device will stop recording user input after a threshold period of time has been reached. The threshold period of time may be defined in the authentication policy.

The client device may convert the user input to a string per 520. The received input may be converted to a string using a predetermined format in plain text. The predetermined format may be defined by the policy for the authentication account.

The client device may communicate the string to an authentication server per 525. The string may be communicated to the authentication server over one or more networks. In some embodiments, the client device further communicates the color key along with the string. The color key may be separate from the string or added on as part of the string. The client device may further communicate identifying information for the client device or the user to the authentication server.

The client device may receive a response from the authentication server per 530. The response may be received from the authentication server over one or more networks. The response may include an indication to unlock the client device or maintain the lock, or it may indicate that an error occurred.

The client device may process the response per 535. If the response includes an indication to unlock the device, the client device may transition the device to an unlocked state. If the response includes an indication to maintain the lock, the client device may maintain the locked state and inform the user that their input was incorrect. If the response includes an error, the client device may inform the user of the error and prompt the user to retry.

Figure 6:
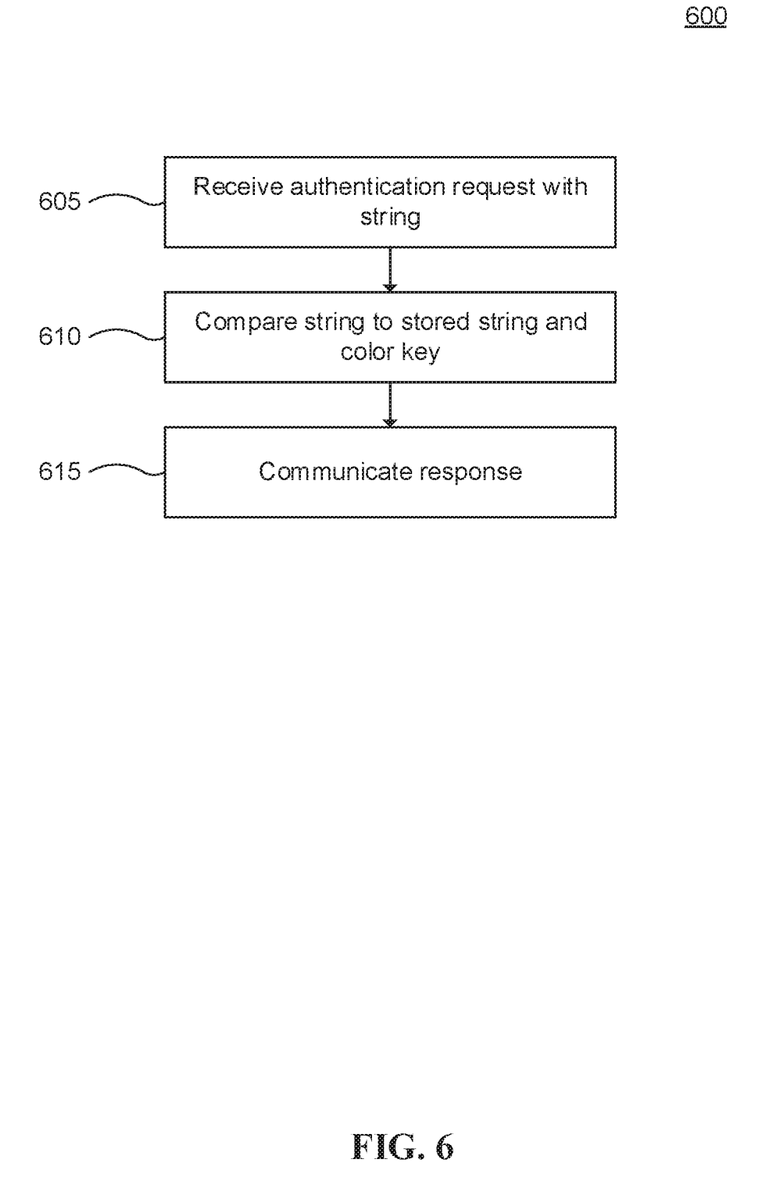
FIG. 6 depicts a flowchart of a method for performing authentication by a server according to embodiments.

Referring now to FIG. 6, a flowchart of a method 600 for performing authentication by a server is depicted according to embodiments. Method 600 may be performed using any suitable computing system such as computer system 701 described in reference to FIG. 7. Method 600 is described herein as being performed by an authentication server such as server 120 described in reference to FIG. 1, but this is not intended to be limiting.

The authentication server may receive a string from a client device per 605. The string may be received from the client device over one or more networks. The authentication server may further receive identifying information for the client device or a user of the client device. In some embodiments, the authentication server further receives a color key from the client device.

The authentication server may compare the string received from the client device to a stored string per 610. The authentication server may identify a stored string using identifying information received from the client device. In some embodiments, the authentication server further compares a color key received from the client device to a stored color key.

The authentication server may communicate a response to the client device based on the comparison per 615. The response may be communicated to the client device over one or more networks. For example, if the authentication server determines that the string matches a stored challenge string, the authentication server may communicate an indication to unlock the client device. If the authentication server determines that the string does not match the stored challenge string, the authentication server may communicate an indication to maintain the lock on the client device. If the authentication server encounters an error, the authentication server may communicate the error to the client device.

Figure 7:
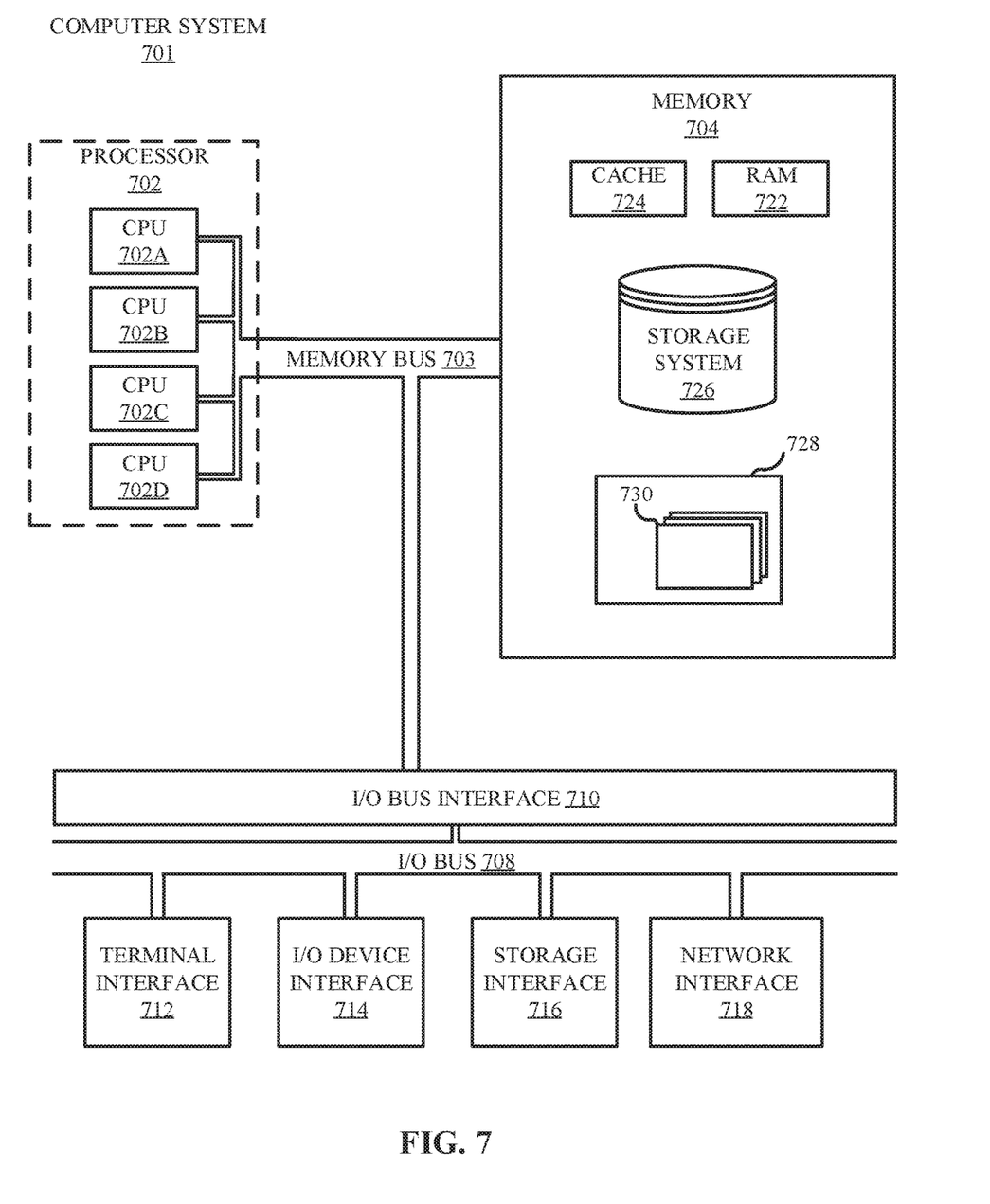
FIG. 7 depicts a block diagram of an example computer system according to embodiments.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    requesting, by a client device, an authentication account from an authentication server;
    receiving, from the server, a policy defining a plurality of aspects defining a challenge using color wheels, the policy defining a number of wheels, a number of sections, a time threshold, a color key, a set of factors for the challenge, and a default position of the color wheels;
    storing the policy in a memory on the client device;
    displaying, on a touchscreen display, a set of color wheels generated according to the policy;
    receiving, via the touchscreen display, a user challenge on the set of color wheels according to the set of factors for the challenge from the policy, the set of factors including color sequence, order of rotation, and direction of rotation;
    converting the user challenge into a user challenge string using a predetermined format in plain text;
    communicating the user challenge string to the authentication server for storage;
    receiving an unlock request from the user;
    in response to receiving the unlock request, displaying, on the display device and while in a locked state, the set of color wheels according to the stored policy;
    receiving, via the touchscreen, user input on the set of color wheels, wherein the user input includes a user rotating one or more color wheels from the set of color wheels to align a color on each color wheel of the set of color wheels with an indicator displayed on the display device;
    converting the user input to a second string, wherein the second string indicates the colors that are aligned with the indicator displayed on the display device and other aspects according to the set of factors for the challenge from the policy;
    communicating the second string to the authentication server;
    receiving, in response to communicating the string, a response from the authentication server; and
    processing the response.

2. The method of claim 1, wherein the response includes an indication to unlock the device and processing the response includes transitioning to an unlocked state.

3. The method of claim 1, wherein the set of color wheels includes 3 color wheels.

4. The method of claim 1, wherein the number of sections for each color wheel is 8.

5. The method of claim 1, wherein the displaying the set of color wheels includes applying a noise filter to the colors prior to rendering.

6. The method of claim 1, wherein the receiving the user input occurs until the time threshold has been reached.

7. The method of claim 1, wherein the set of factors includes speed of rotation, and the user challenge string includes a speed of rotation of the user rotating the one or more color wheels.

8. A system comprising:
    one or more processors; and
    a computer readable storage medium communicatively coupled to the one or more processors, the computer readable storage medium containing program instructions executable by the one or more processors to cause the one or more processors to perform a method comprising:
    requesting, by a client device, an authentication account from an authentication server;
    receiving, from the server, a policy defining a plurality of aspects defining a challenge using color wheels, the policy defining a number of wheels, a number of sections, a time threshold, a color key, a set of factors for the challenge, and a default position of the color wheels;
    storing the policy in a memory on the client device;
    displaying, on a touchscreen display, a set of color wheels generated according to the policy;
    receiving, via the touchscreen display, a user challenge on the set of color wheels according to the set of factors for the challenge from the policy, the set of factors including color sequence, order of rotation, and direction of rotation;
    converting the user challenge into a user challenge string using a predetermined format in plain text;
    communicating the user challenge string to the authentication server for storage;
    receiving an unlock request from the user;
    in response to receiving the unlock request, displaying, on the display device and while in a locked state, the set of color wheels according to the stored policy;
    receiving, via the touchscreen, user input on the set of color wheels, wherein the user input includes a user rotating one or more color wheels from the set of color wheels to align a color on each color wheel of the set of color wheels with an indicator displayed on the display device;
    converting the user input to a second string, wherein the second string indicates the colors that are aligned with the indicator displayed on the display device and other aspects according to the set of factors for the challenge from the policy;

communicating the second string to the authentication server;

receiving, in response to communicating the string, a response from the authentication server; and processing the response.

9. The system of claim 8, wherein the response includes an indication to unlock the device and processing the response includes transitioning to an unlocked state.

10. The system of claim 8, wherein the set of color wheels includes 3 color wheels.

11. The system of claim 8, wherein the number of sections for each color wheel is 8.

12. The system of claim 8, wherein the displaying the set of color wheels includes applying a noise filter to the colors prior to rendering.

13. The system of claim 8, wherein the receiving the user input occurs until the time threshold has been reached.

14. A computer program product comprising a computer readable storage medium having program instructions embodied therewith, the program instructions executable by the one or more processors to cause the one or more processors to perform a method comprising:

requesting, by a client device, an authentication account from an authentication server;

receiving, from the server, a policy defining a plurality of aspects defining a challenge using color wheels, the policy defining a number of wheels, a number of sections, a time threshold, a color key, a set of factors for the challenge, and a default position of the color wheels;

storing the policy in a memory on the client device;

displaying, on a touchscreen display, a set of color wheels generated according to the policy;

receiving, via the touchscreen display, a user challenge on the set of color wheels according to the set of factors for the challenge from the policy, the set of factors including color sequence, order of rotation, and direction of rotation;

converting the user challenge into a user challenge string using a predetermined format in plain text;

communicating the user challenge string to the authentication server for storage;

receiving an unlock request from the user;

in response to receiving the unlock request, displaying, on the display device and while in a locked state, the set of color wheels according to the stored policy;

receiving, via the touchscreen, user input on the set of color wheels, wherein the user input includes a user rotating one or more color wheels from the set of color wheels to align a color on each color wheel of the set of color wheels with an indicator displayed on the display device;

converting the user input to a second string, wherein the second string indicates the colors that are aligned with the indicator displayed on the display device and other aspects according to the set of factors for the challenge from the policy;

communicating the second string to the authentication server;

receiving, in response to communicating the string, a response from the authentication server; and processing the response.

15. The computer program product of claim 14, wherein the response includes an indication to unlock the device and processing the response includes transitioning to an unlocked state.

16. The computer program product of claim 14, wherein the displaying the set of color wheels includes applying a noise filter to the colors prior to rendering.

* * * * *